United States Patent Office 2,958,682
Patented Nov. 1, 1960

2,958,682

METHOD OF PREPARING A POLYMERIC BETAINE

Walter H. Schuller, Stamford, and David C. Guth, Norwalk, Conn., assignors to American Cyanamid Company, New York, N.Y., a corporation of Maine No Drawing. Filed Apr. 27, 1955, Ser. No. 504,352

8 Claims. (Cl. 260—80.3)

This invention relates to a new and improved method of preparing a polymeric betaine. More particularly, it relates to a method of preparing a polymeric betaine which comprises reacting a polymer containing a plurality of tertiary amine groups with an alkali-metal salt of a halogenated monocarboxylic acid represented by the formula

I    X—Z—COOH where X represents a halogen selected from the class consisting of chlorine, bromine and iodine, and Z represents an alkylene radical.

In the copending application of Walter H. Schuller and John A. Price, Serial No. 501,196, filed April 13, 1955, there is disclosed and claimed the preparation of new unsaturated betaines and homopolymers and copolymers thereof. More particularly, that copending application is directed to a new class of compounds embraced by the general formula

II

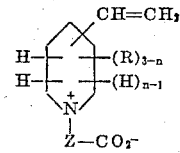

Z—CO$_2$⁻ wherein R represents a lower alkyl radical, Z represents an alkylene radical, and $n$ represents an integer from 1 to 3, inclusive; and to homopolymers and copolymers of compounds of the aforementioned class. Also, in the copending application of Walter H. Schuller and Walter M. Thomas, Serial No. 502,754, filed April 20, 1955, now Patent No. 2,935,493, there is disclosed and claimed the preparation of new unsaturated ammonium betaines and homopolymers and copolymers thereof. Specifically, this second application is directed to a new class of compounds embraced by the general formula

III

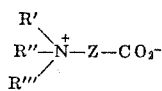

wherein R′ represents an aliphatic radical containing a terminal CH$_2$=C< grouping, R″ and R‴ when taken separately each has the same meaning as R′ and, in addition, an alkyl radical and, when they are jointly taken with the N atom, represent the residue of a heterocyclic tertiary amine, and Z represents an alkylene radical; and to homopolymers and copolymers of compounds of the aforementioned class.

In the copending applications mentioned above polymeric betaines are produced by homopolymerizing a monomeric unsaturated betaine while copolymeric betaines are produced by copolymerizing an unsaturated betaine with a material which is copolymerizable therewith, e.g., acrylamide, vinylpyridines and other compounds containing a CH$_2$=C< grouping.

The method of preparing polymeric betaines in accordance with the present invention differs from the methods of preparing the polymeric betaines disclosed and claimed in the aforementioned copending applications in that a polymer or a copolymer containing a plurality of tertiary amine groups is first prepared, and this polymeric material is then reacted with an alkali-metal salt of a halogenated monocarboxylic acid of the kind specified in the first paragraph of this specification, thereby to produce the polymeric betaine. This method has several advantages over those described in the aforementioned copending applications, among which may be mentioned the fact that available homopolymers and copolymers can be used in producing the polymeric betaine without going through a separate step of preparing the monomeric betaine. Another advantage resides in the fact that some of the monomeric betaines are more difficult to copolymerize with other copolymerizable monomers, due to the fact that the monomeric betaines are ionic in character and are insoluble in suitable solvents for non-ionic comonomers commonly used, for example, styrene; whereas the comonomers employed in practicing the present invention generally have similar solubility characteristics and hence can be copolymerized without difficulty.

Any unsaturated tertiary amine that can be homopolymerized or copolymerized to form a homopolymer or copolymer can be used, and the latter then reacted with an alkali-metal salt of the acid of Formula I to produce the polymeric betaine. Examples of such unsaturated tertiary amines are vinylpyridines represented by the general formula

IV

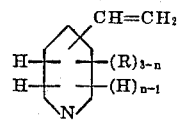

wherein R represents a lower alkyl radical and $n$ represents an integer from 1 to 3, inclusive. More specific examples include vinylpyridines represented by the formula

V

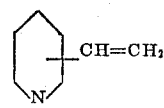

and which include 2-vinylpyridine, 3-vinylpyridine and 4-vinylpyridines; and methyl vinylpyridines represented by the formula

VI

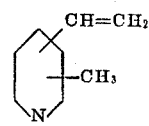

and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, 2-methyl-5-vinylpyridine, and 3-methyl-4-vinylpyridine. The vinylpyridines embraced by Formula VI are a preferred sub-group within a broader class of vinylpyridines that are advantageously employed in practicing the present invention and which may be represented by the formula

VII

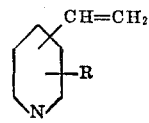

and wherein R represents a lower alkyl radical, more particularly a methyl, ethyl, propyl (including n-propyl and isopropyl), butyl (including n-butyl, isobutyl, sec.-butyl and tert.-butyl) or amyl (including normal and the various amyl) radical. Other examples include 2-vinyl-4,6-dimethylpyridine, 2-vinyl-4,6-diethylpyridine and others embraced by Formula IV.

Other examples of unsaturated tertiary amines that can be homopolymerized and copolymerized to form polymers that can be employed in practicing the present invention are those represented by the general formula VIII
$$R'-\underset{\underset{R'''}{|}}{N}-R''$$

wherein R', R" and R'" each has the same meaning as given above with reference to Formula III.

Illustrative examples of radicals represented by R' in Formula VIII, and which represent preferred sub-classes, are radicals represented by the formulas IX
$$CH_2=\underset{\underset{}{|}}{C}-$$

X
$$CH_2=\underset{\underset{}{|}}{C}-Z'-$$

XI
$$CH_2=\underset{\underset{}{|}}{C}-\underset{\underset{}{\overset{O}{\|}}}{C}-Z'-$$

XII
$$CH_2=\underset{\underset{}{|}}{C}-\underset{\underset{}{\overset{O}{\|}}}{C}-O-Z'-$$

XIII
$$CH_2=CH-O-Z'-$$

XIV
$$CH=\underset{\underset{}{|}}{C}-\underset{\underset{}{\overset{O}{\|}}}{C}-NH-Z'-$$

In Formulas IX to XII and XIV, Y represents a member of the group consisting of hydrogen and alkyl radicals, and in Formulas X-XIV Z' represents an alkylene radical.

Illustrative examples of alkyl radicals represented by Y in the above formulas are methyl, ethyl, propyl, isopropyl, butyl, isobutyl, sec.-butyl, tert.-butyl, amyl, isoamyl, and hexyl to octadecyl, inclusive. Illustrative examples of alkylene radicals represented by Z in Formulas I, II and III and by Z' in Formulas X to XIV, inclusive, are: methylene, ethylene, propylene, butylene, isobutylene, pentylene, isopentylene, hexylene to octadecylene, inclusive. The alkylene radicals represented by Z and Z' can be either straight or branched chain. Preferably Z and Z' each represents an alkylene radical containing from 1 to 4 carbon atoms, inclusive. Illustrative examples of heterocyclic radicals represented by R" and R'" in Formulas III and VIII when they are jointly taken with the N atom are morpholinyl, thiamorpholinyl, piperidyl, pyrrolidyl, piperazyl, imidazolyl, pyrazolyl, pyrryl, pyrrolyl, etc. Additional examples of heterocyclic radicals represented by R" and R'" in Formulas III and VIII when they are jointly taken with the N atom are the C-alkyl (e.g., C-methyl to -octadecyl, inclusive), C-aralkyl (e.g., C-benzyl, C-phenylethyl, C-tolylethyl, C-phenylpropyl, etc.), C-cycloalkyl (e.g., C-cyclopentyl, C-cyclohexyl, etc.), C-aryl (e.g., C-phenyl, C-biphenylyl, etc.) and C-alkaryl (e.g., C-tolyl, C-xylyl, C-ethylphenyl, etc.) derivatives of the aforementioned heterocyclic tertiary-amino radicals given by way of illustration. Such C-substituents can be attached, instead of hydrogen, to any or all of the carbon atoms in the heterocyclic ring.

Illustrative examples of alkali-metal salts of halogenated saturated monocarboxylic acids embraced by Formula I that can be used in producing the polymeric betaine are the alkali-metal salts, e.g., the sodium, potassium, lithium, etc., salts, of the following acids:

Chloroacetic
Iodoacetic
Bromoacetic
Alpha-iodopropionic
Alpha-bromopropionic
Beta-iodopropionic
Beta-bromopropionic
Alpha-chloropropionic
Beta-chloropropionic
Alpha-bromobutyric
Alpha-iodobutyric
Beta-bromobutyric
Beta-iodobutyric
Alpha-bromovaleric and oth r mono-chloro-, mono-bromo- and mono-iodo-monocarboxylic acids containing, for instance, from 6 to 18 carbon atoms, inclusive.

To the best of our knowledge and belief, any homopolymeric or copolymeric material containing a plurality of tertiary amine groups (e.g., 2, 3, 5, 10, 50, 100, 500, 1000 or more) can be betainized, as herein disclosed and claimed, to yield a polymeric betaine. Illustrative examples of tertiary amines containing a polymerizably reactive unsaturated group or groups that can be homopolymerized and copolymerized to yield a polymeric substance that is useful as a starting reactant in practicing the present invention have been given hereinbefore.

Illustrative examples of substances that can be copolymerized with a tertiary amine containing a polymerizably reactive unsaturated group or groups to yield a copolymer for use in practicing the present invention are vinyl compounds, including the vinyl and isopropenyl aromatic compounds, more particularly the vinyl and isopropenyl aromatic hydrocarbons (e.g., styrene, isopropenyl toluene, the various dialkyl styrenes, etc.), other aliphatic compounds containing a $CH_2=C<$ grouping, e.g., acylonitrile and the various substituted acrylonitriles (e.g., methacrylonitrile, ethacrylonitrile, phenylacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, the various N-beta-hydroxyethyl acrylamides, etc.), vinyl esters, e.g., vinyl acetate, vinyl propionate, vinyl butyrate, vinyl isobutyrate, vinyl valerate, vinyl acrylate, vinyl methacrylate, etc., acrylic acids (including acrylic acid itself and the various alpha-substituted acrylic acids, e.g., methacrylic acid, ethacrylic acid, phenylacrylic acid, etc.), esters thereof, more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Other examples of copolymerizable substances that can be employed alone or in conjunction with one or more compounds containing a $CH_2=C<$ grouping include the polymerizable unsaturated alkyd resins (modified or unmodified), e.g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1-64).

Still other examples of materials that can be copolymerized with a tertiary amine containing a polymerizably reactive unsaturated group or groups are given in Kropa Patent No. 2,510,503 (e.g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The proportions of the unsaturated tertiary amine and different unsaturated material which is copolymerizable therewith may be widely varied depending, for instance, upon the particular starting materials employed and the particular properties desired in the copolymer, e.g., in weight ratios of from 0.1:99.9 to 99.9:0.1, and more particularly from 1:99 to 99:1. Mainly for economical reasons, it is usually desirable that the unsaturated tertiary amine does not exceed about 50% by weight of the total monomers. For example, we may use advantageously from, by weight, about 0.3% to about 40% of the unsaturated amine (e.g., a vinylpyridine and specifically 2-methyl-5-vinylpyridine) and from about 60% to about 99.7% of the other copolymerizable substance or substances, e.g., a different vinyl compound or compounds, and more specifically acrylamide, acrylonitrile and other acrylic compounds, in producing the copolymer to be betainized.

The homopolymers and copolymers used in practicing the present invention are prepared by known methods, for instance as described in the aforementioned patents and copending applications.

Other examples of polymeric materials containing tertiary amine groups that can be betainized in accordance with the present invention are homopolymeric N-(hydrocarbon-substituted) ethyleneimines. The hydrocarbon substituent attached to the N atom can be, for example, alkyl, cycloalkyl, aryl, alkaryl, aralkyl, etc. (e.g., methyl, ethyl, cyclohexyl, phenyl, tolyl, benzyl, etc.). Other examples are condensation polymers of an alkylene dihalide and an alkylene di-secondary amine, for instance alkylene dihalides represented by the formulas XV 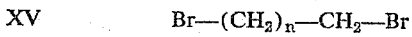

XVI , etc.

and alkylene di-secondary amines represented by the formula

XVII 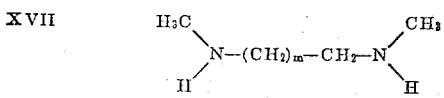

where $n$ and $m$ are whole numbers, e.g., from 1 to 17, inclusive.

The polymeric (homopolymeric or copolymeric) starting reactant employed in practicing the present invention may be linear or it may be one which is capable of being cross-linked, but preferably we use a linear polymer. The use of cross-linked or partly cross-linked polymers is not precluded, since surface betainization at least can be effected; while substantially homogeneous or complete betainization can be secured in those cases where the polymer can be dissolved in a suitable solvent in which the reaction can be effected.

The reaction between the polymeric or copolymeric material containing a plurality of tertiary amine groups and the alkali-metal salt of a halogenated monocarboxylic acid of the kind embraced by Formula I is preferably effected under neutral or alkaline conditions (e.g., at a pH of from 7.0 to about 10.0) and at a temperature of from about 10° C. to about 100° C., more particularly a temperature within the range of from about 20° or 30° C. to about 80°–90° C. The reaction can be effected under aqueous or anhydrous conditions, but preferably is carried out under anhydrous conditions. The reaction can be effected while the polymeric material containing the tertiary amine groups is dissolved in a suitable inert solvent or while it is dissolved or dispersed in an organic or aqueous media, or mixtures thereof. Examples of such media are formamide, dioxane, ketones, e.g., acetone, methyl ethyl ketone, methyl phenyl ketone, etc. The proportions of reactants may be varied as desired or as conditions may require. In general, however, there is used at least one equivalent of the alkali-metal salt of the halogenated acid, and preferably an excess thereof (e.g., from 5 to 200% excess), for each tertiary amine group in the polymer that one wants to betainize.

In order that those skilled in the art may better understand how the present invention can be carried into effect the following examples are given by way of illustration and not by way of limitation. All parts and percentages are by weight unless otherwise stated.

EXAMPLE 1

Betaine of a copolymer of acrylamide and 2-methyl-5-vinylpyridine (A) Preparation of copolymer.—A reaction vessel is equipped with a stirrer, a reflux condenser, a gas-inlet tube, and three dropping funnels. Funnel A is charged with 210 g. of acrylamide, 90 g. of 2-methyl-5-vinylpyridine, 132 ml. of 6 N sulfuric acid and 968 ml. of water. Funnel B is charged with 0.375 g. of ammonium persulfate dissolved in 50 ml. of water. Funnel C is charged with 0.1875 g. of potassium meta-bisulfite dissolved in 50 ml. of water. The contents of the funnels are added in three portions, in constant ratio to each other, over a two and one-half hour period. The temperature during the addition and for four hours subsequent to the last addition is held at 40° C. The Brookfield viscosity of the resulting 10% solution is 10,000 cps. at 25° C. The iodine number of the 10% solution is found to be 2.6 cg. $I_2$/g. The 10% solution is diluted to 5% solids and then freeze-dried.

(B) "Betainization" of the copolymer.—Ten grams of the freeze-dried acrylamide/2-methyl-5-vinylpyridine copolymer is dissolved in 125 ml. of dry formamide and 1.35 g. of sodium methylate added to bring the solution to pH 7. The resulting solution is heated to 88° C. under a reflux condenser, with stirring, and 14 g. of anhydrous sodium chloroacetate slowly introduced. The mixture is held at 88° C. for one hour during which time a total of 1.3 g. of sodium methylate is added in order to maintain the solution at pH 7. A potentiometric titration curve on the product indicates that all of the pyridinium groups in the copolymer have been "betainized." The reaction mass is diluted with an equal weight of water to give a solution containing 2.95% acrylamide/1-carboxymethyl-2-methyl-5-vinylpyridinium betaine by weight.

EXAMPLE 2

A copolymer of a mixture of 85% acrylamide and 15% 2-methyl-5-vinylpyridine, having a Brookfield viscosity at 10% solids of 21,000 cps., is prepared and reacted with sodium chloroacetate in essentially the same manner described under B of Example 1. An aliquot of the betainized reaction mass is titrated potentiometrically and the fact established that reaction is complete.

EXAMPLE 3

A copolymer of a mixture of 95% acrylamide and 5% 2-methyl-5-vinylpyridine, having a Brookfield viscosity at 10% solids of 36,000 cps., is prepared and reacted with sodium chloroacetate in essentially the same manner described under B of Example 1. An aliquot of the betainized reaction mass is titrated potentiometrically and the fact established that reaction is complete.

EXAMPLE 4

Betaine of homopolymeric 2-methyl-5-vinylpyridine

Same as in B of Example 1 with the exception that 10 g. of homopolymeric 2-methyl-5-vinylpyridine is used instead of 10 g. of the described acrylamide/2-methyl-5-vinylpyridine copolymer, and 19.7 g. of anhydrous sodium bromoacetate is employed instead of 14 g. of anhydrous sodium chloroacetate. A potentiometric titration curve on the product indicates that all of the tertiary nitrogen atoms in the polymer have been betainized.

EXAMPLE 5

*Betaine of a copolymer of acrylonitrile and acrylamidopropyldimethylamine*

Fifty grams of a copolymer of a mixture of 90% acrylonitrile and 10% acrylamidopropyldimethylamine and 10.34 g. (0.064 mole) of anhydrous sodium bromoacetate are dissolved in 450 g. of dimethyl formamide containing about 5% water. The mixture is heated to 70° C. on a steam bath until the reaction is essentially complete (e.g., about 2-3 hours) as shown by a titration of an aliquot with silver nitrate solution. A portion of the product is collected by precipitation with water, washed with water, oven-dried, and is titrated with a dioxane solution of perchloric acid, after first dissolving the polymer in nitromethane. The results indicate that only a small portion of the amine groups present are not betainized.

EXAMPLE 6

*Betaine of poly-N-methylethyleneimine*

Ten grams of poly-N-methylethyleneimine is dissolved in 90 g. of a 2:1 mixture of water and methyl ethyl ketone, and 28.2 g. (0.175 mole) of anhydrous sodium bromoacetate is added. The mixture is refluxed for 5 hours. A bromide ion titration indicates that a majority of the tertiary nitrogen groupings are converted to betaine groupings.

EXAMPLE 7

*Gammaine of poly-N-methylethyleneimine*

This example illustrates the preparation of a betaine, specifically a gammaine, of poly-N-methylethyleneimine.

Example 6 is repeated using 30.65 g. of sodium beta-bromopropionate in place of sodium bromoacetate. A bromide ion titration indicates that a majority of the tertiary nitrogen groupings are converted to gammaine groupings; that is, carboxyethyl groups are attached to the tertiary nitrogen atoms.

EXAMPLE 8

*Betaine of a copolymer of acrylonitrile and allyldimethylamine*

Fifty grams of a copolymer of a mixture of 80% acrylonitrile and 20% allyldimethylamine and 38 g. (0.236 mole) of anhydrous sodium bromoacetate are charged to a reaction vessel containing 450 g. of 96% dimethyl formamide (contains 4% water). The mixture is heated on a steam bath for several hours at 80° C. or until a bromide ion titration of an aliquot with standard silver nitrate solution indicates that the conversion to a carboxymethylammonium betaine of a copolymer of acrylonitrile and allyldimethylamine is higher than 90%.

EXAMPLE 9

*Betaine of homopolymeric N-methacrylyl morpholine*

Ten grams of homopolymeric N-methacrylyl morpholine (prepared as described in Patent No. 2,658,056) is dissolved in 90 g. of a 2:1 mixture of dioxane and water. Anhydrous sodium chloroacetate (15.0 g.; 0.129 mole) is added and the mixture refluxed for 3½–4½ hours. A titration for chloride ion and a titration for residual tertiary amine content indicate that the conversion to polymethacrylylcarboxymethylmorpholinium betaine is greater than 93%. This polymeric betaine also may be termed a carboxymethyl betaine of homopolymeric N-methacrylyl morpholine.

EXAMPLE 10

*Betaine of a copolymer of methylstyrene and vinylpyridine*

Forty grams of a copolymer of a mixture of 90% methylstyrene and 10% vinylpyridine (mainly 2-vinylpyridine) is dissolved in 360 g. of dioxane and 30 g. of water. Anhydrous sodium bromoacetate (18.5 g.; 0.114 mole) is added and the mixture heated to 95° C. on a steam bath under reflux until the polymer is completely converted to the 1-carboxymethyl pyridinium betaine of a copolymer of methylstyrene and vinylpyridine, as established by a chloride ion titration and confirmed by a potentiometric titration with standard acid.

EXAMPLE 11

*Betaine of a ternary polymer of acrylonitrile, vinyl acetate and 2-methyl-5-vinylpyridine*

Sixty grams of a ternary polymer of a mixture of 85% acrylonitrile, 7.5% vinyl acetate and 7.5% 2-methyl-5-vinylpyridine is dissolved in 500 g. of dimethyl formamide having a water content of 4%. Anhydrous sodium bromoacetate (12.2 g.; 0.0758 mole) is added and the mixture refluxed for 4 hours. The conversion of the ternary polymer to the corresponding betaine, as determined by titration of an aliquot with silver nitrate solution, is over 90%.

EXAMPLE 12

*Betaine of the reaction product of dimethylamine and homopolymeric p-chlorostyrene*

One hundred grams of a linear polymer containing tertiary amine groups and which is the reaction product of dimethylamine and homopolymeric para-chlorostyrene is dissolved in 900 g. of a 3:3:1 mixture of methyl ethyl ketone, dioxane and water, and anhydrous sodium bromoacetate (164 g.; 1.02 mole) added. The mixture is refluxed with stirring until titration of an aliquot with silver nitrate indicates that the conversion to the corresponding betaine is over 95%.

EXAMPLE 13

The copolymer (ternary polymer) of Example 11 is dissolved in a concentrated aqueous solution of sodium thiocyanate (about 50% sodium thiocyanate in water) in proportions such as will yield a spinning solution containing about 9.4% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 740% while passing through a bath of hot water maintained at a temperature of about 99.5° C., and then is taken up on a bobbin where it is kept in a gelled state by applying a fine spray of water while the fiber is being collected on the bobbin.

Individual swatches of the gelled fiber are bleached by bringing to a boil in 3% aqueous hydrogen peroxide, followed by water washing, then bringing to a boil in 35% nitric acid, and again washing with water. After drying at room temperature, the bleached swatches are dyed in a dyebath consisting of 500 parts of an aqueous solution containing 0.2 part of sulfuric acid, 1 part of sodium sulfate and 0.2 part of Calcocid Alizarine Blue SAPG (Color Index No. 1054). The dyebath is boiled for 30 minutes after which the swatch is filtered off and washed with hot water until the water is free of dye. The fibers are dyed blue. In marked contrast, a fiber similarly prepared from homopolymeric acrylonitrile remains colorless when placed in the same dye bath for the same length of time.

The products resulting from our method are also useful for such purposes and in such applications as were given by way of example in the aforementioned copending Schuller et al. applications.

It will be understood, of course, by those skilled in the art that our invention is not limited to the specific reactants and conditions of reaction given in the foregoing examples by way of illustration. For instance, instead of the alkali-metal salts of the particular chloro and bromo monocarboxylic acids specified in the individual examples, one can use an equivalent amount of an alkali-metal salt of the corresponding iodo monocarboxylic acid. Also, polymeric betaines having carboxyalkyl groups higher than carboxymethyl (or carboxyethyl as in Example 7) are obtained by reacting any of the above-described polymers containing a plurality of tertiary amine groups with a different halogenated compound; that is, by using, instead of the alkali-metal salt actually employed in the individual example, an equivalent amount of a sodium or other alkali-metal salt of a chloro, bromo or iodo, saturated aliphatic, monocarboxylic acid corresponding to the carboxyalkyl group to be introduced into the polymeric betaine.

We claim:

1. The method which comprises bringing into reactive contact with each other, at a pH of not less than about 7.0 and at a temperature of from about 10° C. to about 100° C., (1) a polymer containing a plurality of tertiary amine groups, said polymer being selected from the class consisting of (a) homopolymers of a vinyl-pyridine represented by the general formula (A)
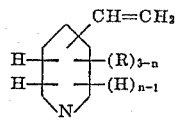

wherein R represents a lower alkyl radical and $n$ represents an integer from 1 to 3, inclusive; (b) homopolymers of an unsaturated amine represented by the general formula (B)
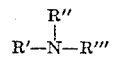

wherein R' represents an aliphatic radical containing a terminal $CH_2=C<$ grouping, R" and R''' when taken separately each has the same meaning as R' and, in addition, an alkyl radical and, when they are jointly taken with the N atom represent the residue of a heterocyclic tertiary amine different from (A); (c) copolymers of any of the compounds embraced by the above-given formulas (A) and (B) with at least one different ethylenically unsaturated substance which is copolymerizable therewith; (d) homopolymeric N-(hydrocarbon-substituted)-ethyleneimines; and (e) condensation polymers of an alkylene dihalide and an alkylene di-secondary amine; and, as the other reactant, (2) an alkali-metal salt of a halogenated monocarboxylic acid represented by the formula

X—Z—COOH where X represents a halogen selected from the class consisting of chlorine, bromine and iodine, and Z represents an alkylene radical, at least one equivalent of the alkali-metal salt of (2) being used for each tertiary amine group in the polymer of (1); and continuing the said reactive contact between the said reactants of (1) and (2) under the said conditions of pH and temperature until there has been obtained a conversion of the polymer of (1) to the corresponding carboxyalkyl betaine thereof.

2. A method according to claim 1 wherein polymer (1) is a polymer of a vinylpyridine having formula (A) as defined in said claim.

3. A method according to claim 2 wherein polymer (1) is a copolymer of copolymerizable ingredients including both (a) acrylamide and (b) a vinylpyridine having formula (A) as defined in claim 1.

4. A method according to claim 3 wherein (b) is 2-methyl-5-vinylpyridine and wherein the quantity of said (b) is from about 0.3% to about 40% by weight of the total amount of (a) and (b).

5. A method according to claim 1 wherein the alkylene radical represented by Z contains from 1 to 4 carbon atoms, inclusive.

6. A method according to claim 1 wherein the alkali-metal salt (2) is sodium chloracetate.

7. A method according to claim 1 wherein polymer (1) is a linear polymer and the reaction between ingredients (1) and (2) is effected under anhydrous conditions.

8. A method according to claim 1 wherein the reaction between ingredients (1) and (2) is effected while maintaining the pH between 7.0 and about 10.0.

References Cited in the file of this patent

UNITED STATES PATENTS

| | | |
|---|---|---|
| 2,487,829 | Richards | Nov. 15, 1949 |
| 2,563,289 | Steinman | Aug. 7, 1951 |
| 2,717,834 | Sauer | Sept. 13, 1955 |
| 2,741,568 | Hayek | Apr. 10, 1956 |
| 2,744,130 | Winberg | May 1, 1956 |
| 2,746,943 | Pritchard | May 22, 1956 |
| 2,771,462 | Shen | Nov. 22, 1956 |
| 2,777,872 | Shacklett | Jan. 15, 1957 |
| 2,804,474 | Lew | Aug. 27, 1957 |

OTHER REFERENCES

Whitmore: Organic Chemistry, p. 594, Van Nostrand, 1937.
Bezzi: CA, 33, p. 6311 (1931).
Gresham: J. Am. Chem. Soc., 73, 3168–71 (1951), abstracted in CA, 46, pp. 1445–1447 (1952).
Rasmussen: J. Am. Chem. Soc., 71, 1073–9 (1949).
Edsall: J. Am. Chem. Soc. 57, 1964, 5 (1935).